Figure 5:
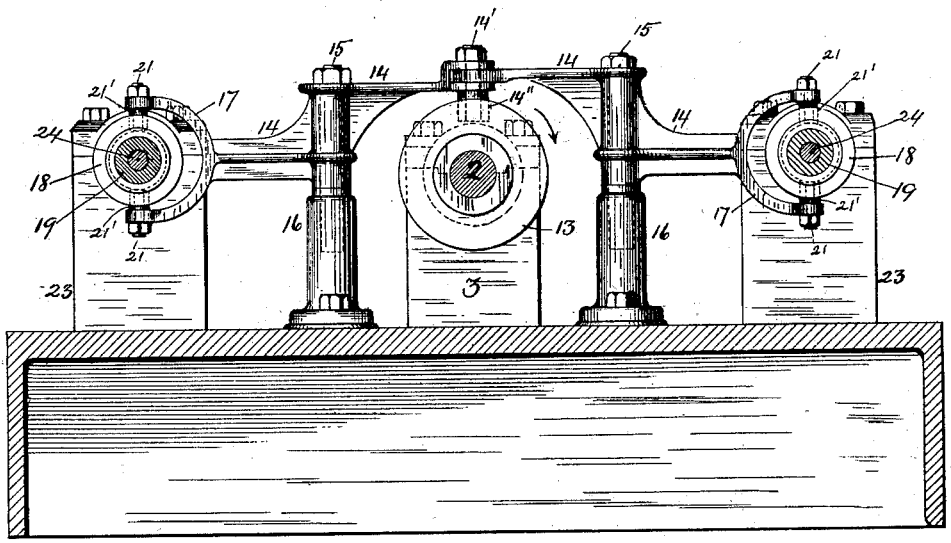

(No Model.) 7 Sheets—Sheet 1.
E. S. LENOX & L. COOK.
MACHINE FOR MAKING WIRE BALE TIES.
No. 374,308. Patented Dec. 6, 1887.
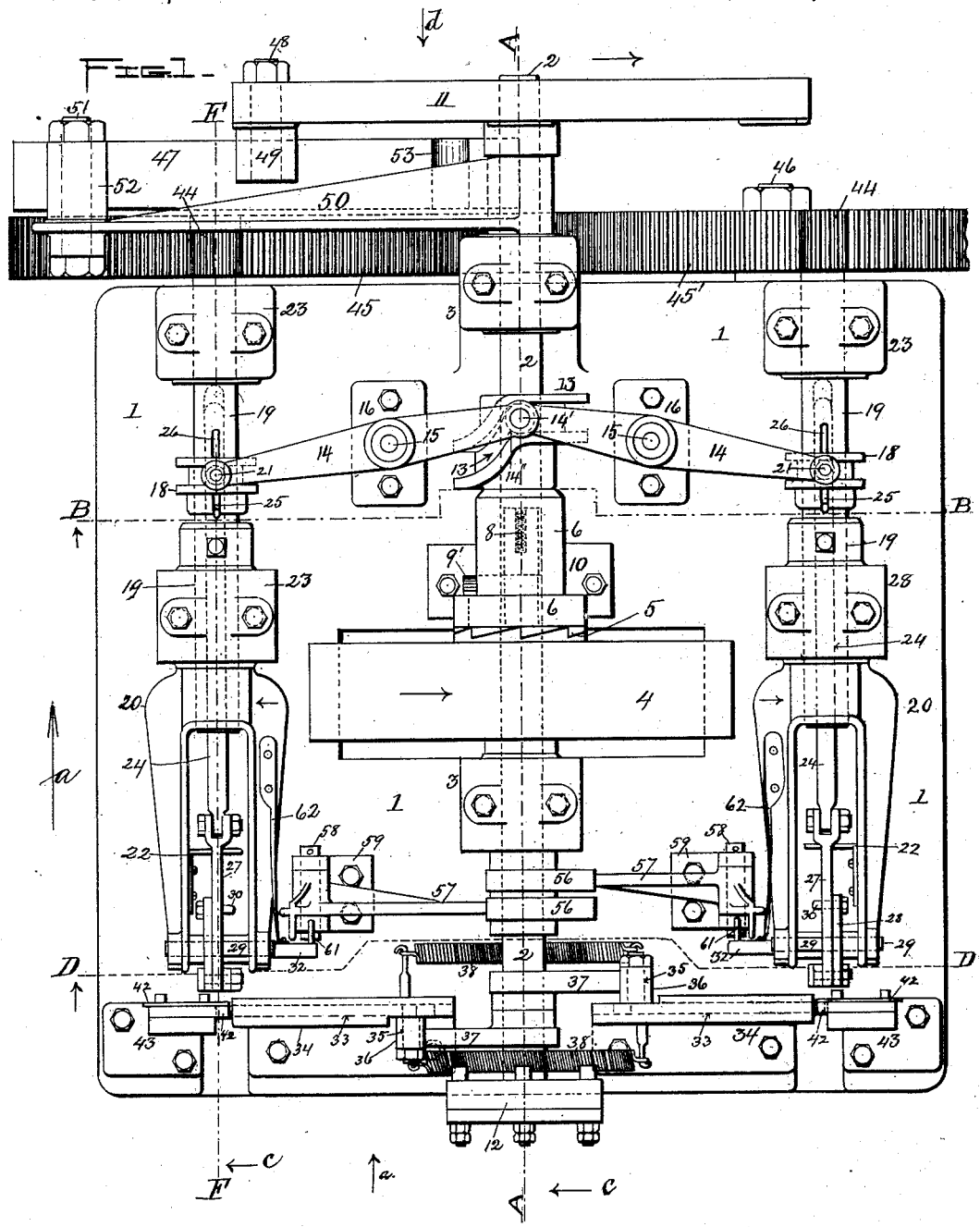
Witnesses:
Fred'k H. Chamberlain
M. Ralph Dryden
Inventors:
Edwin S. Lenox
Leroy Cook
By John C. Dewey, Att'y (No Model.) E. S. LENOX & L. COOK. 7 Sheets—Sheet 2.
MACHINE FOR MAKING WIRE BALE TIES.
No. 374,308. Patented Dec. 6, 1887.
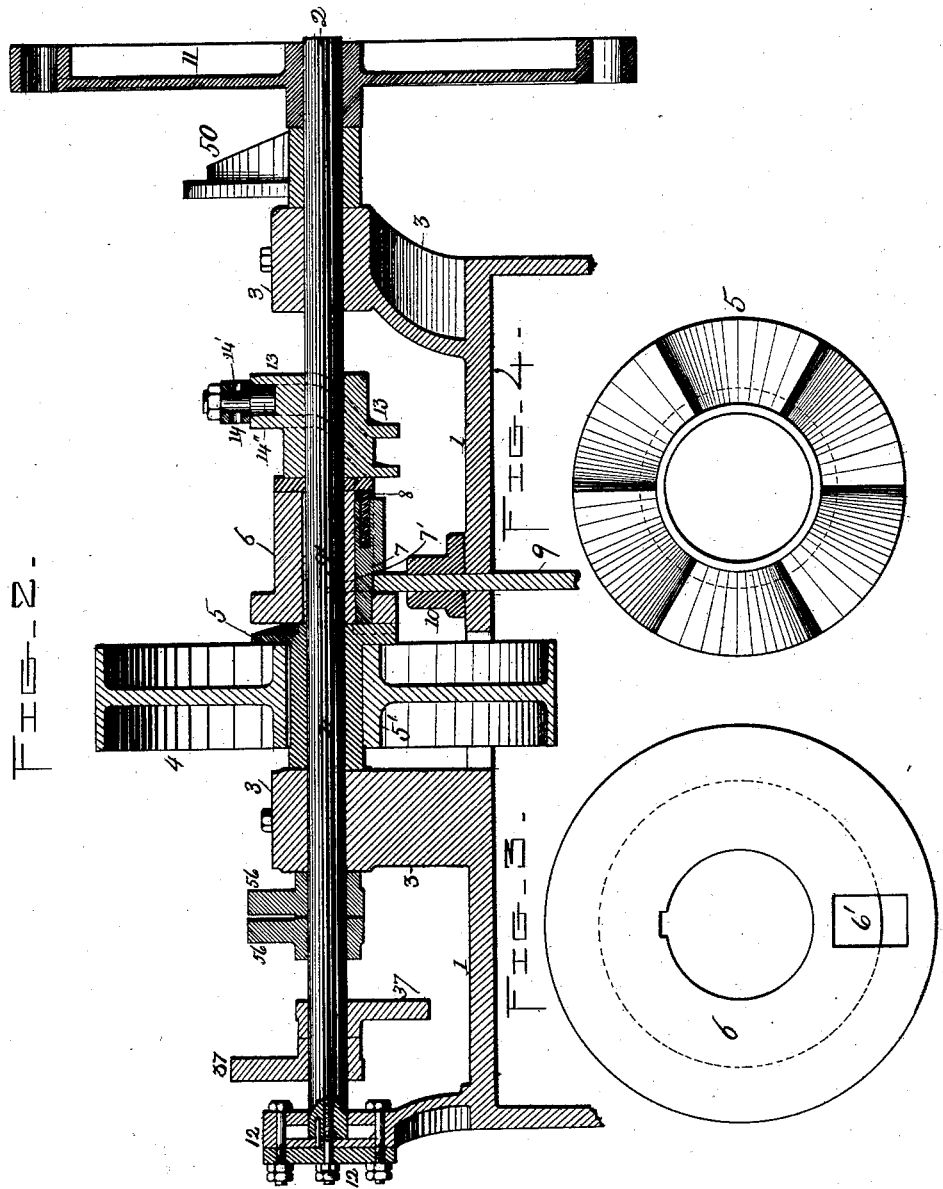
Witnesses:
Fred'k J. Chamberlain
M. Ralph Dryden.
Inventors:
Edwin S. Lenox
Leroy Cook.
By John C. Dewey, Atty (No Model.) 7 Sheets—Sheet 3.

E. S. LENOX & L. COOK.

MACHINE FOR MAKING WIRE BALE TIES.

No. 374,308. Patented Dec. 6, 1887.

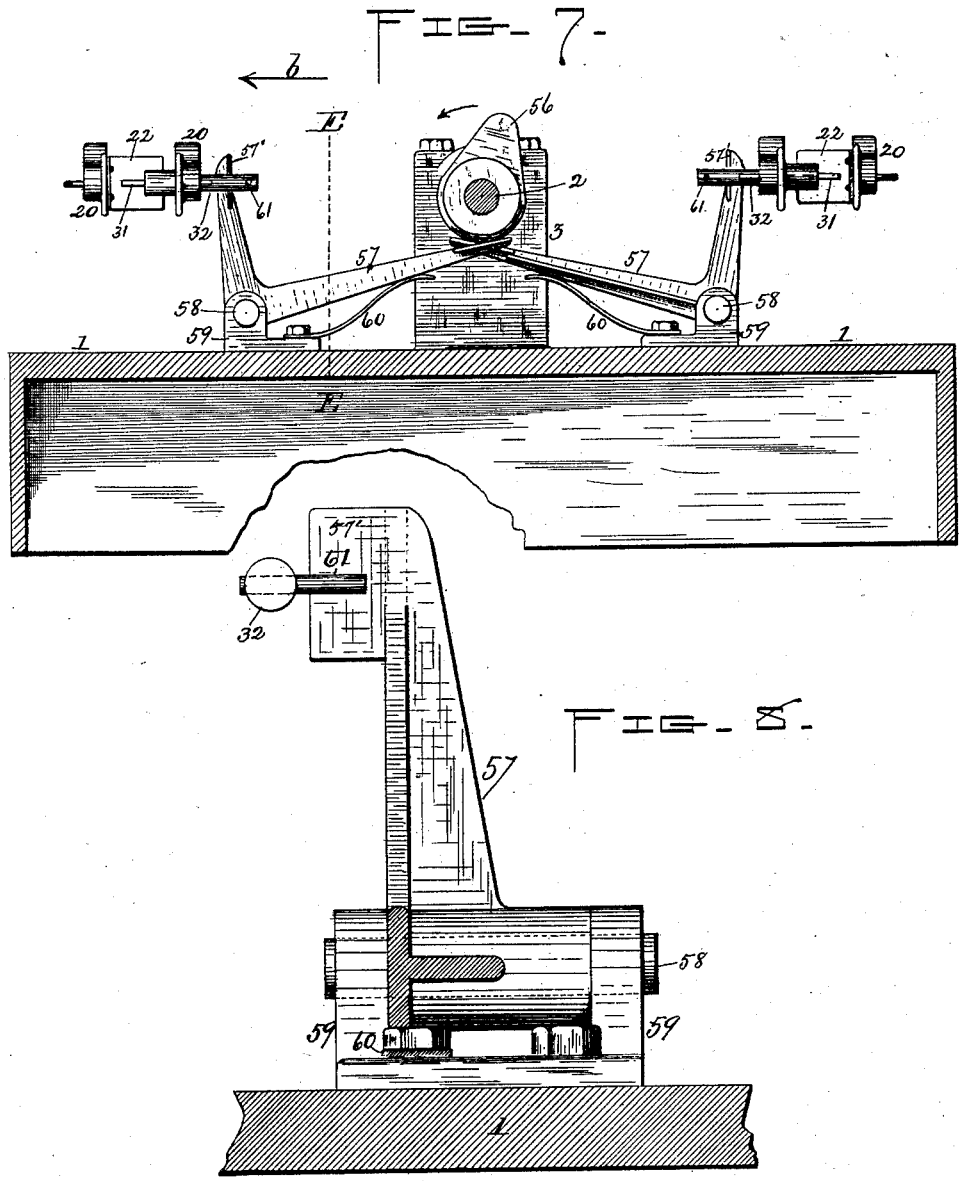

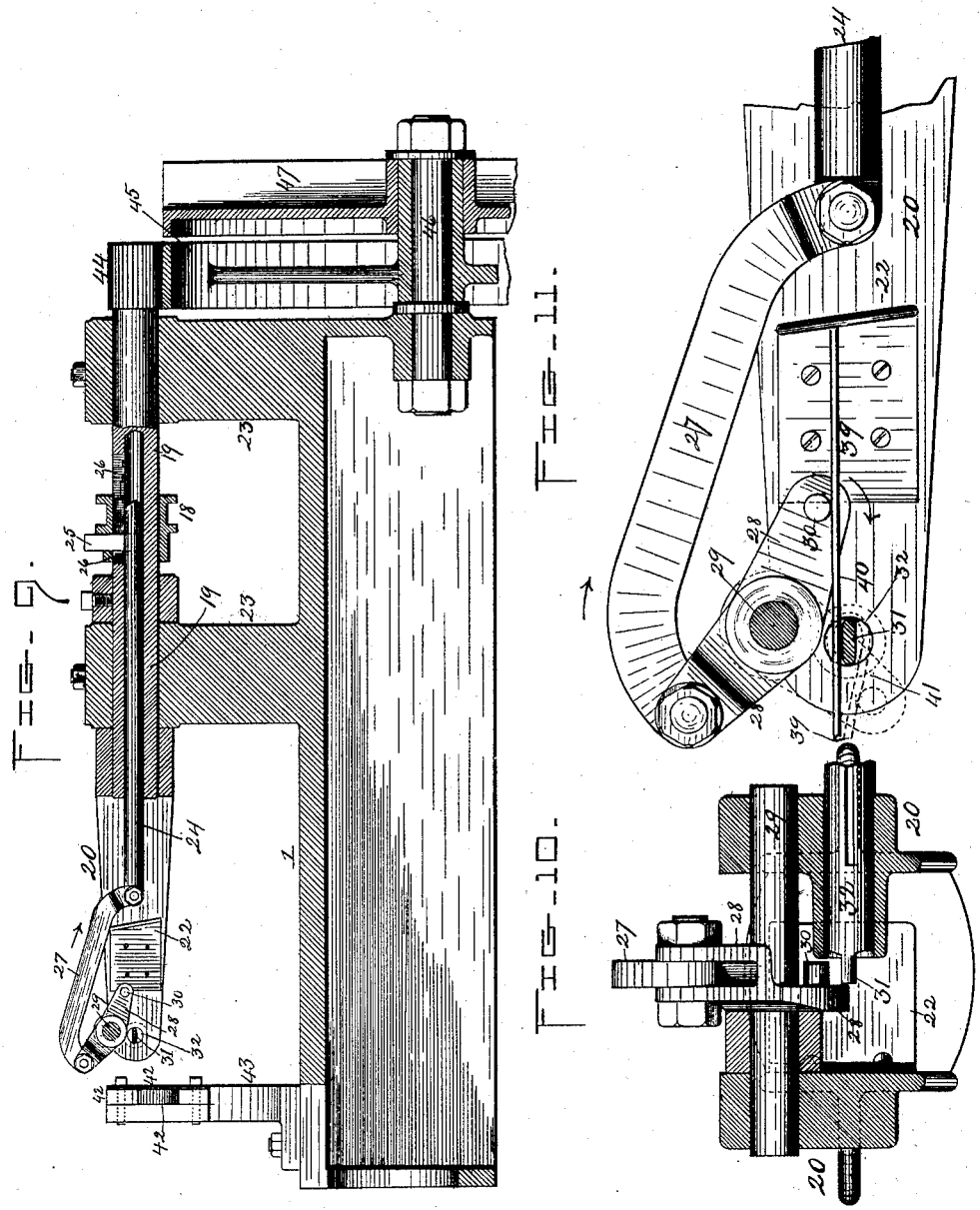

(No Model.) E. S. LENOX & L. COOK. 7 Sheets—Sheet 6.
MACHINE FOR MAKING WIRE BALE TIES.
No. 374,308. Patented Dec. 6, 1887.
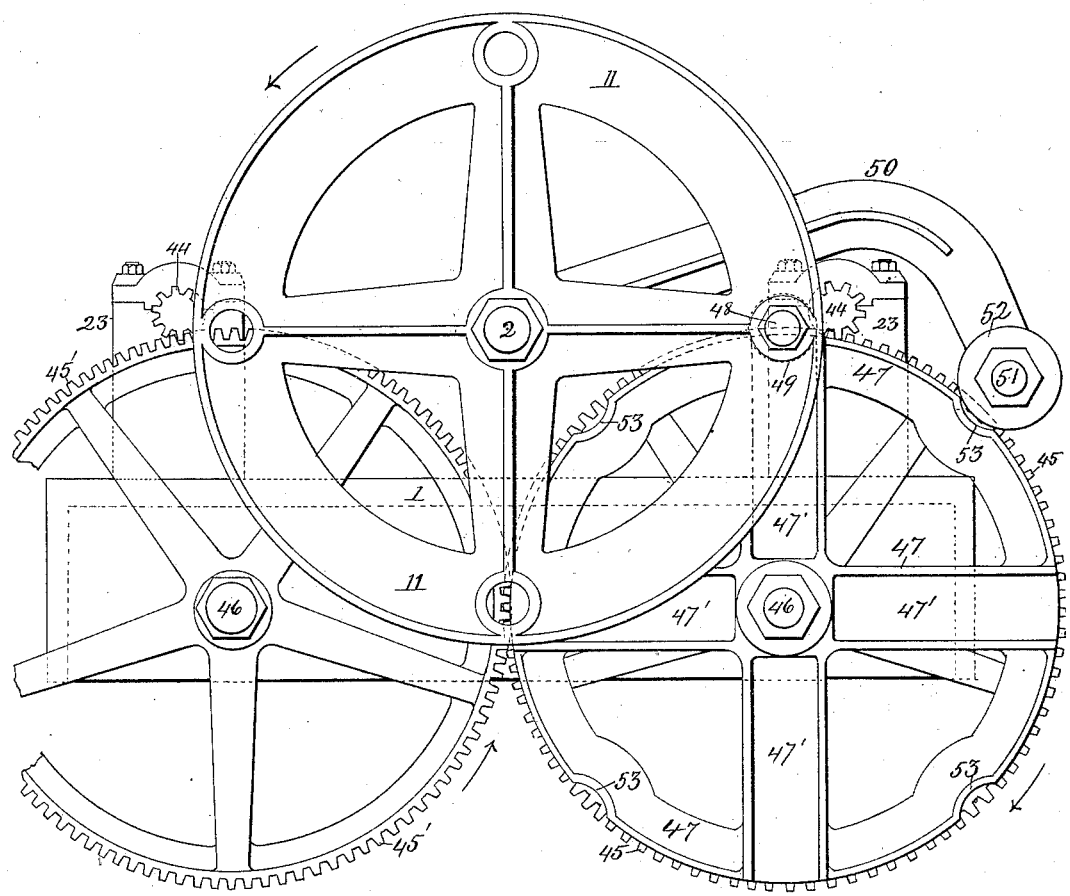

(No Model.) 7 Sheets—Sheet 7.

E. S. LENOX & L. COOK.
MACHINE FOR MAKING WIRE BALE TIES.

No. 374,308. Patented Dec. 6, 1887.

Witnesses;
Inventors;
Edwin S. Lenox
Leroy Cook.
By John C. Dewey Atty.

UNITED STATES PATENT OFFICE.

EDWIN S. LENOX AND LEROY COOK, OF WORCESTER, MASSACHUSETTS; SAID LENOX ASSIGNOR TO THE WASHBURN & MOEN MANUFACTURING COMPANY, OF SAME PLACE.

MACHINE FOR MAKING WIRE BALE-TIES.

SPECIFICATION forming part of Letters Patent No. 374,303, dated December 6, 1887.

Application filed January 10, 1887. Serial No. 223,939. (No model.)

*To all whom it may concern:*

Be it known that we, EDWIN S. LENOX and LEROY COOK, both citizens of the United States, residing at Worcester, in the county of Worcester and State of Massachusetts, have invented certain new and useful Improvements in Machines for Making Wire Bale-Ties; and we do hereby declare that the following is a full, clear, and exact description thereof, which, in connection with the drawings making a part of this specification, will enable others skilled in the art to which our invention belongs to make and use the same.

Our invention relates to power-machines for making wire bale-ties of substantially the description shown in Figure 12 of the drawings—that is, having a loop, hook, or eye at one end, formed by bending the wire, and then intertwisting the projecting end with the body of the tie. The other end of the tie may be left free and straight, to be connected with the manufactured end by inserting it through the loop and twisting it around the body of the tie in the ordinary manner employed in this class of bale-ties.

Our invention consists in certain novel features of construction, arrangement, and combination of parts of a power-machine for making wire bale-ties, as will be hereinafter fully described, and the nature thereof indicated by the claims.

A double machine is illustrated in the drawings, adapted to make two bale-ties at the same time—one upon each side of the machine; but as the two parts of the machine are exact duplicates of each other it will only be necessary to describe one of said parts for making one tie and the mechanism for operating the same. In practice the machine can be made or used either single or double.

We prefer to have the wire from which the bale-ties are made first cut into suitable lengths before the end to be manufactured is inserted into the machine to be operated upon; but, if desired, a continuous wire may be fed into the machine and be cut off at the proper time.

Figure 6:
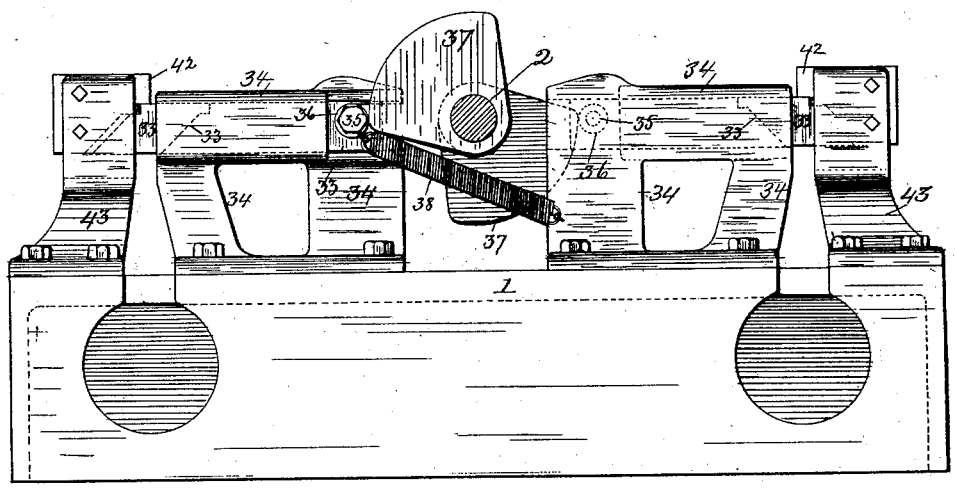
Figure 14:
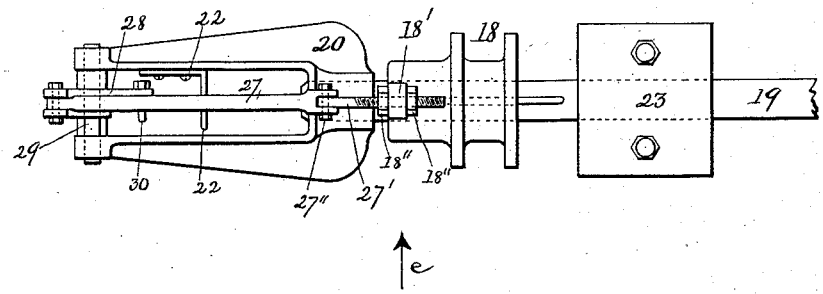
Figure 15:
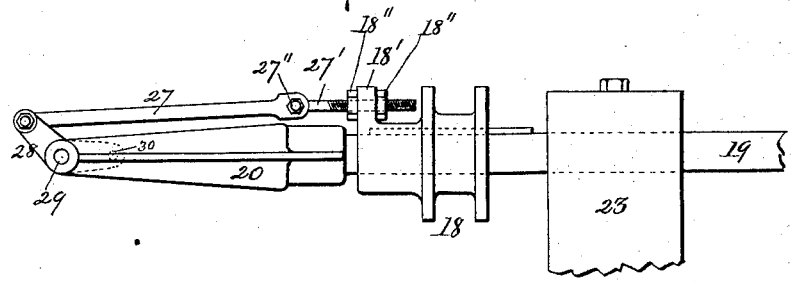

Referring to the drawings, Fig. 1 is a plan view of our machine. The slots at the lower edge of the figure are the points where the ends of the wires are inserted to be operated upon. Fig. 2 is a section on line A A, Fig. 1, showing the main driving shaft of the machine and the parts connected therewith, looking in the direction of arrow c, same figure. Fig. 3 represents, on a greatly enlarged scale, a front end view of the collar 6, shown in Fig. 2, secured on the main shaft, for the purpose to be hereinafter described. Fig. 4 represents, on an enlarged scale, an end view of the clutch-disk 5, shown in Fig. 2, to be hereinafter described. Fig. 5 is a cross-section on line B B, Fig. 1, looking in the direction of arrow a, same figure. This view shows the mechanism for operating the bending-levers, to be hereinafter described. Fig. 6 is a view of the front end of the machine with the friction-box 12, shown in Fig. 1, left off, looking in the direction of arrow a, same figure. Fig. 7 is a cross-section on line D D, Fig. 1, looking in the direction of arrow a, same figure, showing the mechanism for releasing the finished bale-ties from the forming-pins, which are supported in the ends of the revolving fliers, as will be hereinafter fully described. The other connecting parts are left out of this figure for the sake of clearer illustration. Fig. 8 represents, on a much enlarged scale, a detached section, taken on line E E, Fig. 7, looking in the direction of the arrow b, same figure. Fig. 9 is a section on line F F, Fig. 1, looking in the direction of arrow c, same figure, showing the mechanism for bending and forming the loop at the end of the wires, to be hereinafter described. Fig. 10 represents, on a much enlarged scale, and partially in section, a front end view of the left hand flier, shown in Fig. 1, looking in the direction of arrow a, same figure. Fig. 11 represents, on a much enlarged scale, the end of the flier, shown in Fig. 9, detached, the wire being shown in position preparatory to being bent by full lines and by dotted lines after it has been bent. The position of the bending-lever after the wire has been bent around the forming-pin is also shown by dotted lines. Fig. 12 represents a plan view of the manufactured end of a bale-tie adapted to be made by the machine illustrated in the drawings. Fig. 13 is a view of the rear end of the machine, shown in Fig. 1, looking in the direction of arrow d, same figure, showing the mechanism for operating the revolving fliers. Fig. 14 is a top or plan view of the left-hand flier, shown in Fig. 1, detached, illustrating a modification of the mechanism for bending the wire, to be hereinafter fully described, and Fig. 15 is a side view of the flier, shown in Fig. 14, looking in the direction of arrow e, same figure.

Similar figures of reference refer to similar parts in the drawings.

In the accompanying drawings, the part marked 1 is the bed-plate or frame of the machine, supported upon legs or supports, which are not shown in the drawings. Upon said bed-plate 1 are arranged and supported the several parts of the machine, in the manner to be hereinafter fully set forth and described.

The part marked 2 is the main driving-shaft of the machine, supported and turning in bearings 3 upon the bed-plate 1.

The driving-pulley 4, driven by belt or gear-connection in any usual and well-known manner, is loose upon the driving-shaft 2; but is connected therewith for operating the same by means of the clutch mechanism, most clearly illustrated in Fig. 2 of the drawings.

The part marked 5 is the clutch-disk, supported loosely upon the driving-shaft 2, and having its exterior end or surface formed with inclined surfaces or notches, (see Figs. 1, 2, and 4,) and provided with a long sleeve, 5', extending out therefrom and through and keyed to the hub of the driving-pulley 4. The driving-pulley and clutch run loose on the driving-shaft in this instance.

The part marked 6 is a collar keyed to the driving-shaft 2. Said collar is for holding and guiding the driving pin or key 7. Said key 7 is held and guided in the slot 6', formed in the collar 6, and is forced forward by the spiral spring 8. (See Fig. 2.)

The part marked 9 is a vertical sliding bar supported in a stand, 10, upon the bed-plate 1. Said slide 9 is provided with a horn, 9', on one side, encircling the collar 6 for nearly one-quarter of its circumference. The end of the horn 9' is beveled. (See Fig. 1 and dotted lines Fig. 2.)

The sliding bar 9 may be connected at its lower end with a treadle of any ordinary construction and operation, (not shown in the drawings,) and when said bar is pulled downward and away from the collar 6 and the driving-shaft 2 it allows the key or driving-pin 7 to be forced forward by the spring 8, so that its forward end will engage with one of the projections or notches formed on the end of the clutch-disk 5 and set the machine in motion, the sleeve of the clutch-disk 5 being secured to the hub of the driving-pulley 4, as before stated.

The machine is stopped by allowing the slide-bar 9 to return to its original position, for as the key 7 revolves around with the collar 6, secured upon the driving-shaft 2, the shoulder or projection 7', formed on the key 7 will strike upon the beveled point of the horn 9' of the sliding bar 9 and force the key 7 back within the collar 6 and disengage its end from the clutch-disk 5 and allow the driving-pulley 4 to turn loosely on the driving shaft.

The machine shown in the drawings is designed to be operated intermittingly, for the purpose of giving the attendant an opportunity to place in position to be operated upon the plain wires after the manufactured ends of the ties have been made on said machine. One revolution of the main driving-shaft 2 causes all the several parts of the machine to be operated and the looped end of the ties to be made.

In lieu of the clutch mechanism above described, and illustrated in the drawings, for connecting the driving-pulley with the driving-shaft, any other well-known form of clutch mechanism and means for operating the same may be used, and the machine may be operated intermittingly or continuously, as preferred. The driving-pulley may be secured to the driving-shaft and connected with belt-shipping mechanism of any ordinary construction.

Upon one end of the driving-shaft 2, at the rear of the machine, is secured, a crank-wheel, 11, for driving the spindles of the revolving fliers, as will be hereinafter fully described. At the other end of the driving-shaft 2 a friction-box, 12, may be provided, Figs. 1 and 2, the office of which is to overcome the momentum of the crank-wheel 11 and stop the driving-shaft immediately after the key 7 is disengaged from the clutch-disk 5, in the manner hereinbefore described.

Upon the driving-shaft 2 is secured a cam, 13, (see Figs. 1, 2, and 5,) for operating the levers 14 14, jointed together by a stud, 14', carrying a friction-roll, 14", which engages with the grooved surface of the cam 13. The levers 14 14 operate the bending-levers 28, to be hereinafter described.

The levers 14 are supported and pivoted upon studs 15, secured in stands 16, bolted to the bed-plate 1, (see Fig. 5,) and the outer arms of said levers terminate in yokes 17, which partially encircle the grooved collars 18, supported upon and revolving with the spindles 19 of the revolving fliers 20, to be hereinafter described.

Projecting from the ends of the yoke 17 are studs 21, provided with friction-rolls 21', which bear upon the sides of the grooves in the collars 18. The collars 18 can thus be moved back and forth upon the spindles 19 while said spindles 19 and the collars 18 are revolving, by means of the lever-arms 14 and the cam 13 on the driving-shaft 2.

The spindles 19, upon the ends of which are secured the revolving fliers 20, are supported and turn in bearings formed in the stands 23, secured upon the bed of the machine, and said spindles may be made hollow, as shown in Fig.

9, to receive the sliding rod or lever 24, one end of which is connected with the sliding grooved collar 18 on the spindle 19 by means of a flat key, 25, projecting out from the end of said sliding rod 24, through a slot, 26, in the spindle 19 into a hole made in the collar 18. (See Fig. 9.) The other end of the sliding rod 24 is hinged or pivotally connected to one end of a link, 27, the other end of said link being hinged to the bending-lever 28. (See Figs. 9, 10, and 11.) Said bending-lever 28 turns on the fulcrum-pin 29, which passes through both arms of the flier 20 and is secured therein. A stud or pin, 30, projects out from one end of the bending-lever 28, which presses against the end 39 of the wire 40, inserted under it, and bends it around the forming-pin 31, formed upon or secured in the sliding pin 32, supported and sliding in one arm of the flier 20, as shown in Fig. 10, and to be hereinafter described.

As the sliding rod 24 is drawn backward through the spindle 19, (operated by the grooved collar 18, levers 14, and cam 13 on the driving-shaft 2, as hereinbefore described,) the bending-lever 28, through the intervention of the link 27, is thrown into the position shown by dotted lines, Fig. 11, causing the end 39 of the wire to be bent around the forming-pin 31, as indicated by dotted lines, same figure, preparatory to being seized and held during the twisting operation against the main wire by the jaws, to be hereinafter described.

In lieu of the mechanism for bending the wire above described, and illustrated in Figs. 1, 9, 10, and 11 of the drawings, we may substitute the modified form illustrated in Figs. 14 and 15—that is, instead of making the spindles 19 of the fliers 20 hollow, they may be made solid, and the link 27 be pivotally connected at one end with the bending-lever 28, and connected at its other end directly with the grooved collar 18, operated by the bending-lever 14, through the intervention of the pin 27'. (See Figs. 14 and 15.) By this construction we do away with the necessity of boring out the spindle of the flier, the mechanism intervening between the grooved collar 18 and the bending-lever 28 being located upon the exterior of the spindle, as illustrated in Figs. 14 and 15. The grooved collar 18 is provided with an elongated hub and a projection, 18', extending out therefrom, in which is adjustably secured one end of the threaded pin 27' by means of nuts 18''. The other end of said pin 27' is connected with one end of the link 27—in this instance by means of a bolt, 27''. By means of the nuts 18'', in connection with pin 27' and the supporting part 18' of collar 18, we are enabled to vary and adjust the throw of the bending-lever 28.

After the wire has been bent around the forming-pin 31, as above described, to form the loop 41, the projecting end thereof and the main wire 40 of the tie are brought together and held by the sliding jaws 33, in connection with stationary jaw-plates 42, during the twisting operation, to be hereinafter described.

The sliding jaws 33 (see Figs. 1 and 6) are supported and guided in stands 34, secured upon the bed-plate 1. Said slides 33 have studs 35 secured to their rear ends with friction-rolls 36 thereon, which are kept in contact with the cams 37, secured upon the driving-shaft 2, by means of spiral springs 38, secured at one end to said slides and at the other end to the stands 34. (See Figs. 1 and 6.)

The slides 33 have their outer ends beveled downward and notched at their upper part, (see Fig. 6,) for the purpose of lifting or raising the projecting end 39 of the wire after the bending operation, and bringing said end in contact with the main wire 40 and holding them together (between the lines $e\ e$, Fig. 12) in the manner shown in Fig. 6, in connection with the stationary jaw-plates 42, secured upon stands 43, which are secured to the bed-plate.

The stationary jaw-plates 42 are made to match the beveled ends of the sliding jaws 33. (See the outer dotted lines, Fig. 6.) The plain wires are passed longitudinally into the machine through the open space between the stands 34 and 43 under the projecting part of the stationary jaws 42. After the bending of the wires is accomplished to form the loops in the manner above described, the projecting ends 39 are left somewhere between the main wire 40 and the beveled end of the slides 33, so that as the slides are forced forward by the cams 37, secured upon the driving-shaft 2, at the proper time the ends 39 of the wires are lifted on the inclines of said slides and brought into contact with the body 40 of the ties, being boxed in between the shoulders of the jaws 33 and 42, as shown in Fig. 6. The wires are firmly held in this position during the twisting operation, to be hereinafter described, and after the twisting has been done they are dropped, the operating-cams 37 revolving with the shaft 2, allowing the slides 33 to recede, being drawn back by the springs 38.

The dotted lines, Fig. 6, show the two extreme positions of the outer ends of the sliding jaws 33.

After the wire has been bent to form the loop and is held by the jaws 33 and 42, as hereinbefore described, then follows the twisting of the wires to complete the manufactured end of the tie. The twisting is done by means of the revolving fliers 20, secured upon the ends of the spindles 19, supported and turning in bearings upon the stands 23, secured to the bed-plate 1, as hereinbefore described. A gage, 22, is secured upon one arm of the fliers 20, against which the wires strike as they are fed into the machine.

The mechanism for operating the fliers 20 is most clearly illustrated in Figs. 1, 9, and 13. Upon the opposite end of the spindles 19, from where the fliers 20 are secured, are pinions 44, which mesh into large gears 45 and 45', turning upon studs 46, secured in the frame of the machine. (See Fig. 13.) Said gears 45 and 45' mesh into each other. A star-wheel, 47, is keyed to the hub of the gear 45 and revolves with it on stud 46. A crank-wheel, 11, is secured upon the end of the driving-shaft 2, and said crank-wheel is provided with a stud, 48, upon which there is a roll, 49. (See Fig. 1.) The grooved or star wheel 47, secured upon the hub of the gear 45, (see Fig. 9,) has four wide slots or grooves, 47', radiating from the center and open at their outer ends. A locking-arm, 50, is supported and turns loosely upon the driving-shaft 2. A stud, 51, is secured at the end of said arm and carries a roll, 52, thereon. (See Figs. 1 and 13.) The crank-wheel 11 revolves in the direction indicated by the arrow, Figs. 1 and 13, and as said crank-wheel revolves the roll 49 thereon strikes into one of the grooves 47' of the wheel 47 tangentially. At this point the wheel 47 begins to revolve in an opposite direction with an increasing velocity, reaching its highest speed as it passes a line connecting the center of the driving-shaft 2 with the center of the wheel 47, and then decreasing in speed until the roll 49 leaves the groove 47' in said wheel 47. The star-wheel 47 is now at rest, and is kept in position by the locking-roll 52 on the arm 50, resting in a hollow or depression, 53, formed on the periphery of the star-wheel 47. While the wheel 47 is in motion the roll 52 on the locking-arm 50 rolls on the periphery of the wheel 47, as before stated. The star-wheel 47 is keyed to the hub of the gear 45, which gear meshes with the gear 45', and in turn the gears 45 and 45' mesh with the pinions 44, secured upon the ends of the spindles 19 of the fliers 20. The revolution of the star-wheel 47, produced by the roll 49 on the crank-wheel 11, causes the spindles 19 and the fliers 20, secured thereon, to be revolved. The star-wheel 47 makes one-quarter of a revolution every time the roll 49 passes in and out of a groove 47'. This produces three revolutions of the spindles 19 and fliers 20, secured thereon, giving the required number of twists in the tie, as shown in Fig. 12.

It will be understood that in the machine illustrated in the drawings for every complete revolution of the driving-shaft 2 the star-wheel 47 makes one-quarter of a revolution, in the manner as above described. The star-wheel 47, instead of having four slots or grooves, 47', therein, may have a less or greater number, if preferred, and be adapted to put a greater or less number of twists into the wires.

Instead of making the star-wheel 47 and gear 45 separate, as illustrated, they may be made in one piece, and the star-wheel operated by the driving-shaft at the proper time through the intervention of any ordinary crank mechanism.

After the wires have been twisted together and the loop or eye 41 formed, then the manufactured end of the completed tie is automatically released from the central forming-pin, 31, in the manner to be now described, and by the mechanism most clearly illustrated in Fig. 7.

Upon the driving-shaft 2 are secured the cams 56, for operating at the proper time the angle-levers 57, supported and turning on fulcrum-pins 58, secured in stands 59 on the bed-plate 1. (See Fig. 7.)

Spring 60, secured at one end to stands 59, serve to keep the inner arms of the angle-levers 57 in contact with the periphery of the cam 56, as shown in Fig. 7.

In the outer end of one arm of each flier 20 are supported the releasing-pins 32, upon the outer ends of which are the forming-pins 31, before described. A small pin or stud, 61, projects out from the inner ends of the sliding or releasing pins 32, as shown in Figs. 7 and 8. The projecting ends 57' of the angle-levers 57 bear against said pins 61, secured in the ends of the sliding pins 32, as before described, and draw said sliding pins 32 outwardly in the supporting-arms of the fliers 20 as the cams 56 operate said levers 57, thus drawing out the central forming-pins, 31, from the loops 41 of the ties, releasing said loops and allowing the finished ties to drop down, the sliding jaws 33 having been first drawn back, as hereinbefore described.

After the forming-pins have been withdrawn from the loops 41, as above described, the springs 62, secured at one end to one arm of the fliers 20 and at the other end to the releasing-pins 32, (see Fig. 1,) force said releasing-pins 32 and the forming-pins 31, secured thereon, back into their former positions, so that said forming-pins 31 will extend out, as shown in Fig. 10, ready for the wire to be again bent around the same.

The operation of our bale-tie machine will be readily understood from the above description, in connection with the drawings, by those skilled in the art, and a connected idea of the whole operation may be obtained by referring to Fig. 1.

The several parts of the machine should be in substantially the position shown in said Fig. 1. It must be remembered that the driving-pulley 4 is running continually, but that the driving-shaft 2 is operated intermittingly (by means of the clutch mechanism before described) in this instance. The plain wire from which the ties are to be made is first inserted through the open spaces between the stands 34 and 43 and between the bending-pin 30 and the forming-pin 31, until its end strikes the gage 22. (See Fig. 11.) The sliding bar 9 is then drawn down and away from the collar 6 on the driving-shaft 2, thus releasing the driving pin or key 7 and connecting the driving-shaft with the driving-pulley 4, in the manner hereinbefore described, causing the driving-shaft to revolve. As the cam 13, secured on the driving-shaft 2, commences to revolve, it forces the short ends of the levers 14 forward and the long ends backward, carrying the grooved collars 18 backward, and with them the rods 24, (secured to said collars 18 by means of keys 25, extending through the slots 26 in the spindles 19,) and the bending-levers 28 are operated through the connecting-links 27, causing the bending-pins 30 to press against the ends 39 of the wires and bend them around the forming-pins 31, (see Fig. 11,) leaving the ends 39 in front of and beneath the projecting parts of the stationary jaw-plates 42. The sliding jaws 33 are now forced forward by the cams 37 on the driving-shaft 2, and the ends 39 of the wires are lifted and brought into contact with the body 40 of the wires, and are held firmly during the interval of the twisting-operation, boxed in between the stationary jaws 42 and the sliding jaws 33. After the wires are firmly held, as above described, they are twisted together by means of the revolving fliers 20, secured upon the spindles 19, and operated, through the crank-wheel 11, in connection with the star-wheel 47, the gears 45 and 45', and the pinion 44, in the manner hereinbefore fully described. There are three revolutions of the fliers 20, (the ends of the wires being held in contact with the body of the wires, and the loops held upon the forming-pins 31 during said revolutions.) Thus three twists are made between the loop and the point where the wires are held. After the twisting operation the sliding jaws 33 are drawn back by the springs 38, releasing the ties, and at the same time the cams 56, secured upon the driving-shaft 2, operate the levers 57 and draw back the releasing-pins 32 and the forming-pins 31, in the manner hereinbefore described, releasing the loops from the forming-pins and allowing the finished ties to drop down and away from the machine. After the ties have dropped down the releasing-pins 32 and forming-pins 31 are returned to their former positions by the springs 62. The bending-levers 28 are returned to their former positions during the twisting operation by means of the continued revolution of the cam 13 on the driving-shaft 2. Near the end of the revolution of the driving-shaft 2, the notch 7' of the driving-key 7 strikes the beveled end of the horn 9' of the sliding bar 9, causing said key to recede and be disengaged from the clutch-disk 5 and the machine to stop. It is then ready to receive other wires and to be again operated by drawing down the slide 9.

It will be understood that during one complete revolution of the driving-shaft all the parts of the machine illustrated are operated in due order, and two complete bale-ties are made thereon—one on each side of the machine.

As we have before stated, instead of making the machine double, as illustrated in the drawings, adapted to make two bale-ties at once—one upon each side of the machine—we may make it single, or adapted to make only one bale-tie at a time, by simply dispensing with one set of the mechanisms illustrated, and adapted to perform the several operations for making the looped end of the tie.

Instead of an oblong loop in the finished end of the tie, a circular or other form may be made by changing the shape of the forming-pin or substituting a forming-die therefor.

It will be understood by those skilled in the art that the details of construction of the several parts of our machine, and of the mechanisms for carrying out and performing the separate steps in the manufacture of the tie, may be varied somewhat from those described, and illustrated in the drawings, without departing from the principle of our invention; and other well-known and equivalent means for operating the several mechanisms may be employed in lieu of those shown and described, if preferred.

The machine may be operated intermittingly or continuously and wire fed in by hand or automatically, as desired.

Having thus described our improvements in machines for making wire bale-ties, what we claim as new, and desire to secure by Letters Patent, is—

1. The combination, with flier 20, carrying a forming-pin, 31, the supporting-spindle 19, and sliding grooved collar 18 thereon, of bending-lever 28, pivotally supported upon the said flier, and intervening mechanism connecting said lever with the collar 18, substantially as set forth.

2. The combination, with the hollow spindle 19, supporting and carrying the flier 20, and the collar 18, supported and sliding upon said spindle, of the bending-lever 28, pivotally supported on said flier, link 27, and rod 24, sliding longitudinally within the spindle 19, and connected with the collar 18, and means for moving said collar back and forth upon the spindle 19 to operate the bending-lever, substantially as set forth.

3. The combination, with spindle 19, supporting and carrying the flier 20, and provided with a grooved collar, 18, adapted to slide back and forth upon said spindle, of bending-lever 28, pivotally supported on the flier 20, and link 27, adjustably connected with the collar 18, to regulate the throw of the bending-lever, substantially as set forth.

4. In the mechanism for holding the free end of the wire in contact with the main wire during the operation of twisting the wires together, the combination, with the stationary jaw-plate 42, of the sliding jaw 33, provided with a beveled notched outer end adapted to lift up the free end of the wire and bring it in contact with the main wire, and hold the same between the contiguous surfaces of said jaws, and means for moving forward and drawing back said sliding jaw 33 at the proper time, substantially as set forth.

5. The combination, with driving-shaft 2 and cam 37, secured thereon for operating the sliding jaw 33, of said sliding jaw 33, having a beveled notched outer end, and one end of a spring attached to its rear end and adapted to slide back and forth and act as a vise mechanism, in connection with a stationary jaw-plate, 42, substantially as set forth.

6. The combination, with the flier 20 and the sliding pin 32, supported and sliding back and forth in one arm of said flier, and provided at one end with a forming-pin, 31, and connected at the other end with a spring, 62, secured upon said flier, for the purpose stated, and mechanism for drawing out said pin 32, to release the loop, of said mechanism consisting of angle-lever 57, spring 60, and cam 56, secured upon the driving-shaft 2, substantially as shown and described.

7. In a bale-tie machine, the vise mechanism for bringing the free end of the wire, after it is bent around the forming-pin, into contact with the main wire and clamping said wires during the twisting operation, consisting of a stationary jaw-plate and a horizontal sliding jaw provided with a beveled notched outer end, for the purpose stated, and means for operating said sliding jaw, substantially as set forth.

EDWIN S. LENOX.
LEROY COOK.

Witnesses:
JOHN C. DEWEY,
M. RALPH DRYDEN.